March 3, 1964          G. D. THROOP          3,123,762

TRANSISTOR VOLTAGE CONTROL APPARATUS

Filed Dec. 7, 1960

WITNESSES

Leon J. Jaga

Leon M. Garman

INVENTOR
Gilbert D. Throop
BY
Clement L. McHale
ATTORNEY

United States Patent Office 3,123,762
Patented Mar. 3, 1964

3,123,762
TRANSISTOR VOLTAGE CONTROL APPARATUS
Gilbert D. Throop, Shenango Township, Mercer County, Pa., assignor to Westinghouse Electric Corporation, East Pittsburgh, Pa., a corporation of Pennsylvania
Filed Dec. 7, 1960, Ser. No. 74,394
7 Claims. (Cl. 323—22)

This invention relates to electrical control apparatus, such as switching circuits, and more particularly to regulator systems.

In certain types of electrical control apparatus or control systems, a condition responsive device, such as a voltage sensitive relay, is employed which provides an effective output whenever the condition being sensed falls to a value below a first predetermined value or increases to a value above a second predetermined value, but which does not provide an effective output as long as the condition or quantity being sensed is of a value between said first and second predetermined values. A conventional electro-mechanical device of the latter type which includes moving parts has several disadvantages which relate to the speed of operation, the arcing of contacts, and the possible mechanical failure of the moving parts. It is therefore desirable to provide an improved electrical control apparatus of the above type which includes only static components and which overcomes the disadvantages of conventional equipment of the same general type as just described.

It is an object of this invention to provide a new and improved electrical control system.

Another object of this invention is to provide a new and improved regulator system.

A further object of this invention is to provide a new and improved switching circuit for controlling the application of electric power from first and second sources of power to their respective loads in response to variations in a single input signal.

Other objects of the invention will, in part, be obvious and will, in part, appear hereinafter.

Figure 1:
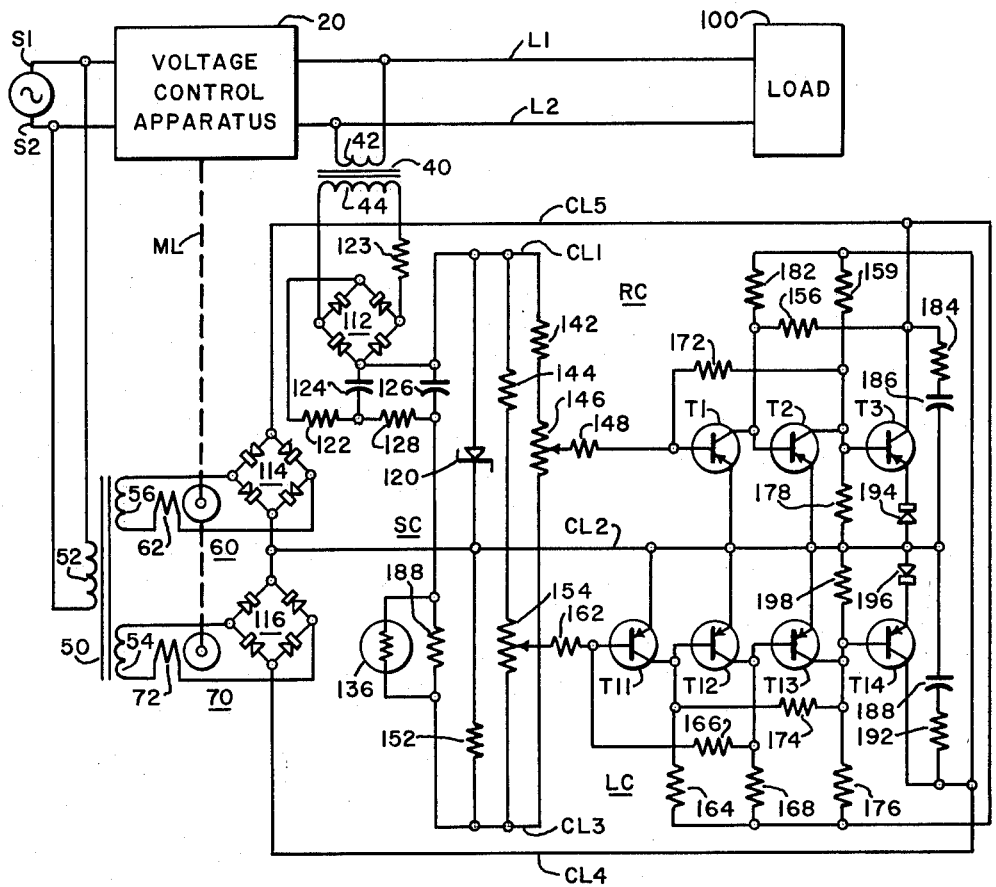
Figure 2:
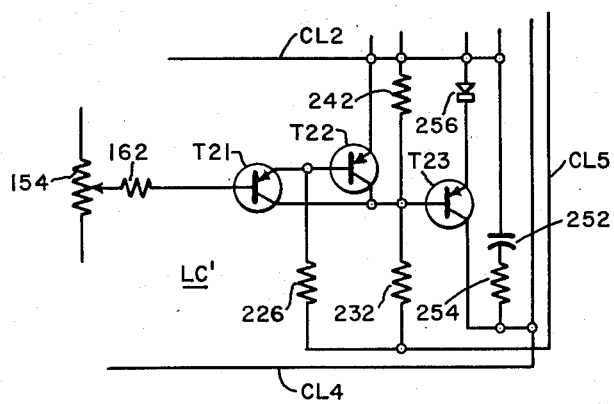

For a fuller understanding of the nature and objects of the invention, reference should be had to the following detailed description taken in connection with the accompanying drawing in which:

FIGURE 1 is a schematic diagram of a regulator system embodying the teachings of the invention; and FIGURE 2 is a partial schematic diagram illustrating a modification of the regulator system shown in FIG. 1.

Referring now to the drawing and FIG. 1 in particular, there is illustrated a regulator system 30 for maintaining the voltage supplied from a source of alternating current indicated at the conductors S1 and S2 to a load circuit, which includes the load 100, at the line conductors L1 and L2 between lower and upper predetermined values. In general, the regulator system 30 includes the voltage sensing or error detecting circuit SC and the raise and lower circuits RC and LC, respectively, for energizing the drive motors 60 and 70, respectively, in response to the output voltage of a voltage control apparatus 20 to thereby maintain the voltage across the load 100 at the line conductors L1 and L2 at substantially a predetermined value or within a substantially predetermined operating range between lower and upper predetermined values. The voltage control apparatus 20 may be of any suitable type such as a tap-changing transformer, a step-type voltage regulator, or an induction regulator as disclosed in copending application Serial No. 32,018, which was filed May 26, 1960, by J. J. Astleford and M. G. Leonard, and which is assigned to the same assignee as the present application.

More specifically, the sensing circuit SC comprises the potential transformer 40, whose primary winding 42 is connected between the line conductors L1 and L2, and a full wave rectifier 112 whose input terminals are connected across the secondary winding 44 of the transformer 40 through the current limiting resistor 123 to obtain an input signal which varies with or is proportional to the output voltage of the voltage control apparatus 20 at the line conductors L1 and L2 across the load 100. The output terminals of the full wave rectifier 112 are connected in circuit relation with a filtering network which includes the capacitors 124 and 126 and the resistors 122 and 128. The filtered unidirectional output voltage of the full wave rectifier 112 is then applied to the conductors CL1 and CL3 through a temperature compensating network which includes the temperature compensating device 136 and the resistor 138. The temperature compensating device 136 may be of any conventional type, such as a thermistor, and serves in cooperation with the resistor 138 to temperature compensate the entire regulator system 30. The unidirectional voltage or signal which appears at the conductors CL1 and CL3 is therefore a measure of the output voltage of the voltage control apparatus 20 at the line conductors L1 and L2 across the load 100.

In order to obtain first and second error or difference control signals which are measures of the deviation of the output voltage of the voltage control apparatus 20 from the desired predetermined operating range, the unidirectional voltage at the conductors CL1 and CL3 of the sensing circuit SC is applied across the first series circuit which includes a voltage reference device, more specifically the semiconductor diode 120, and the current limiting resistor 152 which are connected in series circuit relation with one another between the conductors CL1 and CL3. The diode 120 is preferably of the type known to the art as a Zener diode and includes a substantially constant voltage region in its reverse voltage-current characteristic. Since the voltage at the conductor CL3 is positive with respect to the voltage at the conductor CL1, the diode 120 is poled in the reverse direction and the voltage applied to said diode is always in excess of a predetermined breakdown voltage above which the voltage across said diode remains substantially constant to establish a substantially constant voltage between the conductor CL1 and the conductor CL2, which is connected to the junction between the diode 120 and the current limiting resistor 152. The voltage at the conductors CL1 and CL3 is also applied to the first and second voltage dividing networks which in general are connected in parallel circuit relation with the series circuit which includes the diode 120 and the resistor 152. The first voltage dividing network includes the resistor 144 and the potentiometer 154 which are connected in series circuit relationship with one another between the conductors CL1 and CL3, while the second voltage dividing network includes the resistor 142 and the potentiometer 146 which are connected in series circuit relation with one another between the conductor CL1 and the conductor CL3. Since the voltage between the conductor CL1 and the conductor CL2 across the diode 120 remains substantially constant, while the voltages between the conductor CL1 and the arms of the potentiometers 146 and 154 vary with the output voltage of the voltage control apparatus 20, first and second difference control signals will result between the conductor CL2 and the arms of the potentiometers 146 and 154, respectively.

The setting of the arm of the potentiometer 146 will be adjusted to establish a lower predetermined limit or value for the output voltage of the voltage control apparatus 20 across the load 100, while the setting of the arm of the potentiometer 154 will be adjusted to establish an upper predetermined limit or value for the output voltage of said voltage control apparatus. In other words, the settings of the potentiometers 146 and 154 are adjusted to establish a bandwidth or operating range of the output voltage of the voltage control apparatus 20. In the operation of the voltage control apparatus 20, when the output voltage of said apparatus across the load 100 tends to decrease, the difference between the voltage across the diode 120 and the voltage between the conductor CL1 and the arm of the potentiometer 146 will increase to thereby actuate the rise circuit RC which will then energize the drive motor 60 to actuate the voltage control apparatus 20 until the output voltage of said apparatus is restored to the lower predetermined limit or value of the desired operating range. On the other hand, when the output voltage of the voltage control apparatus 20 tends to increase, the difference between the voltage across the diode 120 and the voltage between the conductor CL1 and the arm of the potentiometer 154 will increase, until the lower circuit LC is actuated to energize the drive motor 70 which will then actuate the voltage control apparatus 20 in the opposite direction to reduce the output voltage of said apparatus to the upper predetermined limit or value of the desired operating range.

In general, the raise circuit RC comprises a plurality of NOT logic elements or switching amplifiers, more specifically the switching transistors T1 and T2 which are arranged to control the operation of a switching device, more specifically the switching transistor T3, to energize the drive motor 60 through the full wave rectifier 114 in response to an input signal from the sensing circuit SC whenever the voltage across the load 100 decreases to a value below the desired predetermined lower limit or value. It should be noted that the switching transistors T1 through T3 may be described as NOT logic elements since each of said switching transistors is arranged to provide an effective output in the absence of a particular input and not to provide an output when the the input is of a particular value. In particular, each of the switching transistors T1, T2 and T3, which are illustrated as being of the p-n-p type, includes a base, an emitter and a collector. The base of the first transistor T1 is connected to the arm of the potentiometer 146 through the current limiting or biasing resistor 148, while the emitter of the transistor T1 is connected to the conductor CL2. The collector of the transistor T1 is connected through the resistor 182 to the negative output terminal of the full wave rectifier 116 whose input terminals are connected in series circuit relation with the main winding of the drive motor 70, the latter series circuit being connected across the secondary winding 54 of the transformer 50 whose primary winding 52 is connected to the source conductors S1 and S2. The collector of the transistor T1 is also directly connected to the base of the transistor T2 while the emitter of the transistor T2 is directly connected to the conductor CL2. Similarly to the first transistor T1, the collector of the second transistor T2 is connected through the resistor 159 to the negative output terminal of the full wave rectifier 116. The collector of the transistor T2 is also connected through the positive feedback resistor 172 to the base of the first transistor T1 to provide bistable operation of the transistors T1 and T2. The collector of the transistor T2 is also directly connected to the base of the third switching transistor T3. The collector of the transistor T3 is connected through the conductor CL5 to the negative output terminal of the full wave rectifier 114 whose input terminals are connected in series circuit relationship with the main winding 62 of the drive motor 60, the latter series circuit being connected across the secondary winding 56 of the transformer 50. The emitter of the transistor T3 is connected through the diode 194 to the positive output terminal of the full wave rectifier 114 through the conductor CL2 which is also connected to the positive output terminal of the full wave rectifier 116. The collector of the transistor T3 is also connected through the positive feedback resistor 156 to the base of the transistor T2 in order to provide bistable operation of the transistors T2 and T3 during the operation thereof. The base of the transistor T3 is connected to the conductor CL2 through the resistor 178, while a filtering circuit comprising a resistor 184 and the capacitor 186 connected in series circuit relationship with one another is connected between the conductor CL2 and the collector of the transistor T3.

It is important to note that the emitter-collector path of the transistor T3 is connected across the unidirectional terminals of the rectifier 114 through the diode 194 to control the operation of the drive motor 60, while the first and second switching transistors T1 and T2 have their collectors connected in circuit relation with the unidirectional terminals of the full wave rectifier 116 through the load resistors 182 and 159 respectively, the full wave rectifier 116 functioning as a power supply or source for the switching transistors T1 and T2 which are connected in circuit relation between the sensing circuit SC and the final switching transistor T3 as preamplifiers. It is also to be noted that the diode 194 is provided as a biasing device to reduce leakage current in the transistor T3 when the latter transistor is in the non-conducting state or cutoff condition.

In the operation of the raise circuit RC, the first and third switching transistors T1 and T3 are normally arranged to be substantially non-conducting or cut off in the absence of a sufficient input signal between the base and emitter of the first transistor T1. The input signal between the base and emitter of the first transistor T1 is determined by the difference between the voltage across the diode 120 and the voltage between the conductor CL1 and the arm of the potentiometer 146. As long as the output voltage of the voltage control apparatus 20 across the load 100, as sensed by the sensing circuit SC, remains above substantially a predetermined lower limit or value, the latter difference voltage will either be insufficient or of the improper polarity to cause the first transistor T1 to become conducting or to turn the first transistor T1 "on" to thereby cause the first transistor T1 to carry saturation current in the emitter-collector path thereof and to reverse the conduction states of the following switching transistor stages T2 and T3. The effective impedance between the emitter and collector of the third or final switching transistor T3 which is effectively connected between the negative and positive unidirectional or output terminals of the full wave rectifier 114 will therefore remain relatively high and the drive motor 60 will remain deenergized since a corresponding high impedance will appear across the input or alternating current terminals of the full wave rectifier 114, which is connected between the secondary winding 56 of the transformer 50 and the winding 62 of the motor 60. When, however, the output voltage of the voltage control apparatus 20 at the line conductors L1 and L2 decreases to a value below the substantially predetermined lower limit or value as determined by the setting of the potentiometer 146, the difference voltage between the base and the emitter of the first switching transistor T1 will become sufficient to change the conduction state of the first transistor T1 from a substantially non-conducting or cutoff condition to a conducting or "on" condition in which the first transistor T1 will carry saturation current between the emitter and collector thereof. The latter change in the conduction state of the first switching transistor T1 will be coupled to the second switching transistor T2 to thereby change the conduction state of second transistor T2 to a substantially non-conducting or cutoff condition, and the change in the conduction state of the transistor T2 will be coupled to the third transistor T3 to change the conduction state of the latter transistor to a substantially conducting or "on" condition in which the third transistor T3 will carry saturation current between the emitter and collector thereof. The effective impedance in the emitter collector path of the transistor T3 will therefore decrease to decrease the effective impedance between the secondary winding 56 of the transformer 50 and the winding 62 of the motor 60 and the drive motor 60 will be energized from the source conductors S1 and S2 through the transformer 50. The drive motor 60 will then rotate in a first predetermined direction to actuate the voltage control apparatus 20 to increase the output voltage of said voltage control apparatus at the load conductors L1 and L2 until the difference signal at the input of the first transistor T1 of the raise circuit RC decreases to a value below that necessary to maintain the first transistor T1 in the conducting state in which it is carrying saturation current between the emitter and collector thereof.

Similarly the lower circuit LC includes a plurality of NOT logic elements or switching amplifiers, more specifically the switching transistors T11 through T14 which in general are connected in circuit relation between the sensing circuit SC and the drive motor 70 to energize the latter drive motor whenever the output voltage of the voltage control apparatus 20 across the load 100 exceeds substantially a predetermined upper limit or value.

More specifically, the base of the first switching transistor T11 of the lower circuit LC is connected to the arm of the potentiometer 154 through the current limiting resistor 162, while the emitter of the transistor T11 is connected directly to the conductor CL2. The collector of the transistor T11 is directly connected to the base of the transistor T12 and also through the load resistor 164 to the negative terminal of the full wave rectifier 114. The emitter of the transistor T12 is directly connected to the conductor CL2, while the collector of the transistor T12 is connected to the negative terminal of the full wave rectifier 114 through the load resistor 168. The collector of the transistor T12 is also connected through the positive feedback resistor 166 to the base of the transistor T11 in order to provide bistable operation of the transistors T11 and T12. The collector of the transistor T12 is also directly connected to the base of the transistor T13, while the emitter of the transistor T13 is directly connected to the conductor CL2. The collector of the transistor T13 is connected through the load resistor 176 to the negative terminal of the full wave rectifier 114 and also through the positive feedback resistor 174 to the base of the transistor T12 in order to provide bistable operation of the transistors T12 and T13. The collector of the transistor T13 is also directly connected to the base of the transistor T14, while the collector of the transistor T14 is directly connected to the negative terminal of the full wave rectifier 116 through the conductor CL4. The emitter of the transistor T14 is connected through the biasing diode 196 to the positive terminal of the full wave rectifier 116. The base of the transistor T14 is connected to the conductor CL2 through the biasing resistor 198, while a filtering circuit which comprises the resistor 192 and the capacitor 188 connected in series circuit relationship with one another is connected between the conductor CL2 and the collector of the transistor T14.

It is important to note that the emitter-collector path of the final switching transistor T14 of the lower circuit LC is connected across the unidirectional terminals of the full wave rectifier 116 through the diode 196 while the collectors of the first, second and third switching transistors T11, T12 and T13, respectively, of the lower circuit LC are connected in circuit relation with the full wave rectifier 114 through the load resistors 164, 168 and 176 respectively, the full wave rectifier 114 functioning as a power supply or source for the switching transistors T11, T12 and T13 of the lower circuit LC which are connected in circuit relation between the sensing circuit SC and the final switching transistor T14 as preamplifiers.

In the operation of the lower circuit LC, the switching transistors T11 and T13 are arranged to be normally conducting saturation current in the absence of a sufficient input signal between the base and the emitter of the first switching transistor T11, while the switching transistors T12 and T14 are normally arranged to be substantially non-conducting or cut-off in the absence of a sufficient input signal between the base and the emitter of the first switching transistor T11. The effective impedance between the emitter and collector of the final switching transistor T14 of the lower circuit LC therefor similarly provides relatively high effective impedance between the negative and positive terminals of the full wave rectifier 116 and introduces an effectively high impedance in series circuit relationship with the main winding 72 of the motor 70 to maintain said motor in a substantially deenergized condition in the absence of the necessary input signal between the base and emitter of the transistor T11.

As mentioned previously, the input signal between the base and the emitter of the switching transistor T11 is the difference between the voltage across the semiconductor diode 120 and the voltage between the conductor CL1 and the arm of the potentiometer 154. As long as the output voltage of the voltage control apparatus 20 at the line conductors L1 and L2 remains below substantially a predetermined desired upper limit or value, the latter difference voltage is sufficient to maintain the first switching transistor T11 in a conducting or "on" condition in which it is conducting substantially saturation current between the emitter and the collector thereof. When, however, the output voltage of the voltage control apparatus 20 across the load 100 increases to a value above the desired upper limit or value, the input voltage applied to the switching transistor T11 decreases in a value below that necessary to maintain the switching transistor T11 in a conducting or "on" condition in which it is conducting saturation current. During the latter operating condition, the following switching transistors are actuated to opposite conduction states so that the switching transistors T12 and T14 begin to conduct saturation current between the emitter and collector thereof or are turned "on," while the switching transistor T13 is actuated to substantially a non-conducting or cutoff condition. When the switching transistor T14 begins to conduct saturation current between the emitter and collector thereof or is turned "on," and the effective impedance between the emitter and collector of the transistor T14 is reduced to a relatively low value, the corresponding impedance between the alternating current terminals of the full wave rectifier 116 is also reduced to a relatively low value, so that the voltage applied to the main winding 72 of the drive motor 70 is sufficient to energize the drive motor 70. The drive motor 70 then actuates the voltage control apparatus 20 in the opposite direction until the output voltage of said apparatus across the load 100 has decreased to a value below the desired upper predetermined limit or value. The difference input voltage between the base and the emitter of the switching transistor T11 then increases to the value necessary to restore the switching transistor T11 to a conducting condition and the following switching transistors are actuated to the opposite induction states, the switching transistor T14 being restored to a substantially non-conducting or cutoff condition and the motor 70 is then deenergized. It should be noted that the additional switching transistor stage is required in the lower circuit LC since the output voltage of the voltage control apparatus 20 is changing in a direction which is opposite to that which actuates the raise circuit RC and the additional switching transistor stage is necessary to provide the proper output phase or proper sense of the output logic from the lower circuit LC.

It is important to note that the final switching transistors T3 and T14 of the raise circuit RC and the lower circuit LC, respectively, control the application of power from the windings 56 and 54 of the transformer 50 which may be considered as first and second sources of electric power to the motors 60 and 70, respectively, through the full wave rectifiers 114 and 116, respectively. On the other hand, the power supply for the transistors T1 and T2 of the raise circuit RC which operate as preamplifiers for the input signal from the sensing circuit SC is connected in circuit relation with the opposite full wave rectifier 116. Similarly the switching transistors T11, T12 and T13 which also operate as preamplifiers for the input signal from the sensing circuit SC before it is applied to the final switching transistor T14 are connected in circuit relation with the opposite full wave rectifier 114 which operates as a power supply for the switching transistors T11, T12 and T13. The latter arrangement which eliminates the need for separate or additional power supplies for the transistors T1, T2 and T11 through T13, considered as preamplifiers, is possible because when the final switching transistor T3 or T14 of the raise and lower circuits RC and LC, respectively, is actuated in response to an input signal from the sensing circuit SC to lower the effective impedance of its associated full wave rectifier 114 or 116 the other full wave rectifier is available as a power supply for the switching transistors functioning as preamplifiers for the final switching transistor thus actuated.

Referring now to FIG. 2, there is illustrated an alternative lower circuit LC' which may be substituted for the lower circuit LC in the regulator system 30 in certain applications in order to reduce the number of switching transistors required in the lower circuit while still obtaining a proper sense or phase in the output at the final switching transistor. Similarly to the lower circuit LC, the lower circuit LC' shown in FIG. 2 includes a plurality of switching amplifiers, more specifically the switching transistors T21 through T23 which in general are connected in circuit relation between the sensing circuit SC and the drive motor 70 to energize the latter drive motor whenever the output of the voltage control apparatus 20 exceeds substantially a predetermined upper limit or value.

More specifically, the base of the switching transistor T21 is connected to the arm of the potentiometer 154 through the current limiting resistor 162, while the emitter of the transistor T21 is directly connected to the base of the following switching transistor T22. The emitter of the transistor T21 is also connected to the negative terminal of the full wave rectifier 114 through the resistor 226 and the conductor CL5. The collectors of the switching transistors T21 and T22 are connected to each other and also to the base of the final output switching transistor T23. The emitter of the switching transistor T22 is directly connected to the conductor CL2, while the collector of the transistor T22 is also connected to the negative terminal of the full wave rectifier 114 through the load resistor 232 and the conductor CL5. The switching transistors T21 and T22 are connected in circuit relation in an arrangement which is commonly referred to in the art as a Darlington connection and together function as a single switching transistor having a high current gain or amplification. The base of the final switching transistor T23 is connected to the conductor CL2 through the biasing resistor 242 while the emitter of the transistor T23 is connected to the positive terminal of the full wave rectifier 116 through the diode 256 and the conductor CL2. The collector of the transistor T23 is connected to the negative terminal of the full wave rectifier 116 through the conductors CL4 while a filtering circuit which includes the resistor 254 and the capacitor 252 connected in series circuit relationship is connected between the collector of the transistor T23 and the conductor CL2. The switching transistor T21 may also be described as an emitter follower, while the switching transistor T22 may be described as a NOT logic element or amplifier.

In the operation of the lower circuit LC' the switching transistors T21 and T22 are arranged to be normally conducting saturation current in the absence of the proper input signal between the base and the emitter of the first switching transistor T21 while the final or output switching transistor T23 is normally arranged to be substantially non-conducting or cut off in the absence of the proper input signal between the base and the emitter of the switching transistor T21. Similarly to the operation of the lower circuit LC previously described, when the output voltage of the voltage control apparatus 20 increases to a value above the desired upper limit, the input voltage applied to the switching transistor T21 decreases to a value below that necessary to maintain the switching transistors T21 and T22 in a conducting condition and the final or output switching transistor T23 is actuated to a conducting condition. When the final switching transistor T23 conducts saturation current, and the effective impedance between the emitter and collector thereof is reduced to a relatively low value, the corresponding impedance across the alternating current terminals of the full wave rectifier 116 is also reduced to a relatively low value so that the voltage applied to the main winding 72 of the drive motor 70 is sufficient to energize the drive motor 70. The drive motor 70 is thus energized to actuate the voltage control apparatus 20 in such a direction as to reduce the output voltage of the voltage control apparatus 20 to a value below the desired upper limit. The difference input voltage between the base and emitter of the switching transistor T21 then increases to the value necessary to restore the switching transistor T21 to a conducting condition and the switching transistor T23 is actuated to a non-conducting condition through the switching transistor T22 and the drive motor 70 is then deenergized.

In summary, in an electrical control apparatus as disclosed, the raise and lower circuits RC and LC, respectively, cooperate with the associated sensing circuit SC to operatively connect one of the drive motors 60 or 70 to the associated sources of power whenever the condition being sensed at the line conductors L1 and L2 varies outside a predetermined operating range either above or below predetermined upper and lower values. As long as the condition being sensed by the sensing circuit SC lies within the predetermined operating range, neither the raise or lower circuits RC and LC, respectively, provides an effective output. It should be noted that the control provided by the raise and lower circuits RC and LC, respectively, and the associated sensing circuit SC is completely static in operating without any movable parts.

It is to be understood that the raise and lower switching circuits RC and LC, respectively, in combination with the associated sensing circuit SC may be also employed to control the application of unidirectional current power to associated load circuits in response to the variations in a single input signal rather than controlling the application of alternating current electric power to respective loads as in the regulator system described. The latter application would eliminate the requirement for the full wave rectifiers 114 and 116 which are employed in the regulator system 30 as disclosed. It is also to be understood that the number of switching amplifiers or transistors employed in a control system as disclosed may vary in accordance with the output power requirements of the system so as to vary the number of stages of preamplification required in a particular system.

The control apparatus embodying the teachings of this invention has several advantages. For example, the type of control disclosed employs only static components and therefore requires only a minimum of maintenance as compared to conventional control equipment of the same general type. In addition, the number of separate or independent power supplies required for the preamplifiers in a control system as disclosed is reduced by the interconnection of the preamplifiers or switching transistor stages in the raise circuit with the power supply being controlled by the output switching transistor of the lower circuit and the corresponding interconnection of the earlier transistor stages in the lower circuit LC with the power supply being controlled by the output transistor of the raise circuit RC.

Since numerous changes may be made in the above-described control apparatus and circuits, and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. An electrical control system for controlling the application of electric power from at least first and second sources to their respective loads in response to a single input signal applied at the input terminals of said system comprising first and second pluralities of switching transistors connected in circuit relation with said input terminals, the final switching transistors of said first and second pluralities being connected in circuit relation between said first and second sources, respectively, and their respective loads, the balance of the switching transistors of said first and second pluralities being connected in circuit relation with said second and first sources, respectively, the final switching transistors of said first and second pluralities being actuated by input signals of lower and upper predetermined values to operatively connect one or the other of said first and second sources to its respective load for the application of electric power thereto, neither of said sources being operatively connected to their respective loads by said final switching transistors when the value of said signal is between said lower and upper predetermined values.

2. An electrical control system for controlling the application of electric power from at least first and second sources to their respective loads in response to a single input signal applied at the input terminals of said system comprising first and second pluralities of switching amplifiers connected in circuit relation with said input terminals, the final switching amplifiers of said first and second pluralities being connected in circuit relation between said first and second sources, respectively, and their respective loads, the balance of the switching amplifiers of said first and second pluralities being connected in circuit relation with said second and first sources, respectively, the final switching amplifiers of said first and second pluralities being actuated by input signals of lower and upper predetermined values to operatively connect one or the other of said first and second sources to its respective load for the application of electric power thereto, neither of said sources being operatively connected to their respective loads by said final switching amplifiers when the value of said input signal is between said lower and upper predetermined values.

3. An electrical control system for selectively controlling the application of electric power from first and second sources of alternating current to their respective loads in response to variations of a single input signal at the input terminals of said system comprising first and second rectifier means having alternating current terminals connected in circuit relation with said first and second sources, respectively, and unidirectional current terminals, and first and second pluralities of interconnected bistable switching transistors each having a base, an emitter and a collector, said first and second pluralities being connected in circuit relation between said input terminals and said first and second rectifier means, respectively, the emitter-collector paths of the final output transistors of said first and second pluralities being connected across the unidirectional current terminals of said first and second rectifier means, respectively, the other transistors of said first and second pluralities being connected in circuit relation with the unidirectional terminals of said second and first rectifier means, the final output transistors of said first and second pluralities being actuated by input signals of lower and upper predetermined values to operatively connect either said first or second source to its respective load and being substantially non-conducting for input signals between said lower and upper predetermined values.

4. An electrical control system for selectively controlling the application of electric power from first and second sources of alternating current to their respective loads in response to variations of a single input signal at the input terminals of said system comprising first and second rectifier means having alternating current terminals connected in circuit relation with said first and second sources, respectively, and unidirectional current terminals, and first and second pluralities of interconnected bistable switching devices each having a base, an emitter and a collector, said first and second pluralities being connected in circuit relation between said input terminals and said first and second rectifier means, respectively, the emitter-collector paths of the final output devices of said first and second pluralities being connected across the unidirectional current terminals of said first and second rectifier means, respectively, the other devices of said first and second pluralities being connected in circuit relation with the unidirectional terminals of said second and first rectifier means, the final output devices of said first and second pluralities being actuated by input signals of lower and upper predetermined values to operatively connect either said first or second source to its respective load and being substantially non-conducting for input signals between said lower and upper predetermined values.

5. A regulator system for maintaining the voltage supplied from a main source of electric power to a load between substantially lower and upper values comprising an error detecting circuit connected in circuit relation with said load for obtaining first and second error signals which vary with the deviation of the voltage across said load from said lower and upper values, respectively, raise and lower circuits connected in circuit relation with said error detecting circuit to be responsive to said first and second error signals, respectively, for restoring the voltage across said load to a value between said lower and upper values, said raise and lower circuits each comprising a plurality of interconnected bistable switching elements connected in circuit relation with first and second auxiliary sources of power, the final output elements of said raise and lower circuits being connected in circuit relation with said first and second sources, respectively, the balance of the switching elements in said raise and lower circuits being connected in circuit relation with said second and first auxiliary sources, respectively.

6. A regulator system for maintaining the voltage supplied from a main source of electric power to a load between substantially lower and upper values comprising an error detecting circuit connected in circuit relation with said load for obtaining first and second error signals which vary with the deviation of the voltage across said load from said lower and upper values, respectively, raise and lower circuits connected in circuit relation with said error detecting circuit to be responsive to said first and second error signals, respectively, for restoring the voltage across said load to a value between said lower and upper values, said raise and lower circuits each comprising a plurality of interconnected bistable switching transistors connected in circuit relation with first and second auxiliary sources of power, the final output transistors of said raise and lower circuits being connected in circuit relation with said first and second sources, respectively, the balance of the switching transistors in said raise and lower circuits being connected in circuit relation with said second and first auxiliary sources, respectively.

7. A regulator system for maintaining the voltage supplied from a source of electric power to a load between substantially lower and upper predetermined values comprising first means including first and second motor means connected between said source and said load for varying the voltage applied to said load, second means for providing a reference voltage, third means for comparing different portions of the voltage across the load with said reference voltage to obtain first and second difference signals, and first and second pluralities of interconnected bistable switching transistors, each of said pluralities being connected in circuit relation between said third means and one of said first and second motor means to control the energization thereof from first and second sources of electric power, respectively, in response to predetermined magnitudes of said first and second difference signals, respectively, the final output transistors of said first and second pluralities being connected in circuit relation with said first and second sources, respectively, to conduct saturation current when one of said difference signals reaches one of said predetermined magnitudes and to energize the associated motor means to restore the voltage across the load to a value between said upper and lower predetermined values, the balance of the transistors of said first and second pluralities being connected in circuit relation with said second and first sources, respectively.

References Cited in the file of this patent

UNITED STATES PATENTS 2,913,657    Erickson _____ Nov. 17, 1959